(12) United States Patent
Lee et al.

(10) Patent No.: US 12,360,668 B2
(45) Date of Patent: Jul. 15, 2025

(54) MEMORY MANAGEMENT METHOD FOR CONTINUOUSLY RECORDING DIGITAL CONTENT AND CIRCUIT SYSTEM THEREOF

(71) Applicant: Getac Technology Corporation, New Taipei (TW)

(72) Inventors: Yu-Cheng Lee, Taipei (TW); Hsien-Yang Chiang, Taipei (TW)

(73) Assignee: Getac Technology Corporation, New Taipei (TW)

( * ) Notice: Subject to any disclaimer, the term of this patent is extended or adjusted under 35 U.S.C. 154(b) by 43 days.

(21) Appl. No.: 18/484,594

(22) Filed: Oct. 11, 2023

(65) Prior Publication Data

US 2024/0152273 A1 May 9, 2024

Related U.S. Application Data

(60) Provisional application No. 63/423,453, filed on Nov. 7, 2022, provisional application No. 63/449,272, filed on Mar. 1, 2023.

(51) Int. Cl.
*G06F 3/06* (2006.01)
*G08B 13/196* (2006.01)
(Continued)

(52) U.S. Cl.
CPC .......... *G06F 3/0604* (2013.01); *G06F 3/0655* (2013.01); *G06F 3/0676* (2013.01);
(Continued)

(58) Field of Classification Search
CPC .............. G11B 20/10527; G10L 15/22; G10L 2025/783; G10L 2025/786; G10L 21/034;
(Continued)

(56) References Cited

U.S. PATENT DOCUMENTS 8,726,331 B2   5/2014   Ngo et al.
8,910,219 B2   12/2014  Liu et al.
(Continued)

FOREIGN PATENT DOCUMENTS

EP   0601814 A2   6/1994
TW   200614161 A   5/2006
(Continued)

OTHER PUBLICATIONS

Search Report issued on Apr. 9, 2024 for EP application No. 23202395.2, 7 pages.

*Primary Examiner* — Jane W Benner
(74) *Attorney, Agent, or Firm* — Cooper Legal Group, LLC

(57) ABSTRACT

A memory management method for continuously recording digital content and a circuit system operating the method are provided. The circuit system includes a control circuit, a memory, and a storage device. The memory has a buffer that is defined as a pre-buffer or a main buffer based on a current recording mode. In the method, the circuit system loads continuously-received data and sequentially saves the data in the buffer that is defined as the pre-buffer in a first-in-first-out manner before a start-record instruction is received. After the start-record instruction is received, the data buffered in the pre-buffer is combined with the data that is continuously recorded to the main buffer. This file is then written to the storage device until a stop-record instruction is received.

18 Claims, 5 Drawing Sheets

(51) Int. Cl.
  *G10L 15/22* (2006.01)
  *G10L 21/034* (2013.01)
  *G10L 21/0364* (2013.01)
  *G10L 25/78* (2013.01)
  *H01H 9/16* (2006.01)
  *H04N 7/18* (2006.01)

(52) U.S. Cl.
  CPC ..... *G06F 3/0679* (2013.01); *G08B 13/19621* (2013.01); *G10L 15/22* (2013.01); *G10L 21/034* (2013.01); *G10L 21/0364* (2013.01); *G10L 25/78* (2013.01); *H01H 9/161* (2013.01); *H04N 7/185* (2013.01); *G10L 2025/786* (2013.01)

(58) Field of Classification Search
  CPC ..... G10L 21/0364; G10L 25/21; G10L 25/60; G10L 25/78; G08B 13/19621; G06F 1/163; G06F 1/1686; G06F 3/0604; G06F 3/0655; G06F 3/0676; G06F 3/0679; G16H 10/20; G16H 50/20; G16H 50/30; G16H 50/70
  See application file for complete search history.

(56) References Cited

U.S. PATENT DOCUMENTS

| | | | |
|---|---|---|---|
| 9,530,509 | B2 | 12/2016 | Lin et al. |
| 9,742,975 | B2 | 8/2017 | O'donnell et al. |
| 10,446,183 | B2 | 10/2019 | Smith et al. |
| 2006/0056543 | A1 | 3/2006 | Hsiao |
| 2007/0233721 | A1 | 10/2007 | Bazar |
| 2009/0052286 | A1 | 2/2009 | Yamada et al. |
| 2014/0104493 | A1* | 4/2014 | Liu ............ H04N 19/172 348/E7.003 |
| 2017/0094231 | A1 | 3/2017 | Elkenkamp |
| 2017/0339366 | A1 | 11/2017 | Park |
| 2018/0278257 | A1* | 9/2018 | Omori ............ G11B 20/10527 |
| 2020/0245188 | A1 | 7/2020 | Zhang et al. |
| 2021/0174863 | A1 | 6/2021 | Ware et al. |
| 2022/0027057 | A1* | 1/2022 | Kim ............ G06F 3/0605 |

FOREIGN PATENT DOCUMENTS

| | | |
|---|---|---|
| TW | 201540077 A | 10/2015 |
| TW | I516950 B | 1/2016 |
| TW | 201610959 A | 3/2016 |
| TW | 201635296 A | 10/2016 |

\* cited by examiner

MEMORY MANAGEMENT METHOD FOR CONTINUOUSLY RECORDING DIGITAL CONTENT AND CIRCUIT SYSTEM THEREOF

CROSS-REFERENCE TO RELATED PATENT APPLICATIONS

This application claims the benefit of priorities to the U.S. Provisional Patent Application Ser. No. 63/423,453, filed on Nov. 7, 2022 and Ser. No. 63/449,272, filed on Mar. 1, 2023, which applications are incorporated herein by reference in their entireties.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a method of memory management, and more particularly to a memory management method configured to store digital content that is continuously generated by a recording device and a circuit system thereof.

BACKGROUND OF THE DISCLOSURE

In a device that is used to continuously generate audiovisual data, such as an electronic device that is able to generate or process the audiovisual data, a buffer that can quickly access the data can be used to buffer the audiovisual data that is generated. The audiovisual data buffered in the buffer is then stored to a storage device. Thus, the audiovisual data that is continuously generated is stored to the storage device with the data integrity being ensured. Afterwards, a streaming audiovisual content can be outputted smoothly without reducing the performance of processing (e.g., encoding and decoding) the audiovisual data.

In general, the electronic device transmits data at a certain rate and is capable of data processing. It is necessary to use the buffer as an intermediate memory between the operations of transmitting the data and processing the data since there is a certain rate difference among the rates of receiving the data, processing the data, and outputting the data. However, there is still room for improvement of the conventional buffer to truly ensure the data integrity for the audiovisual data that is continuously generated in the electronic device. For example, it should be ensured that frame drop and image loss do not occur when processing the audiovisual data.

SUMMARY OF THE DISCLOSURE

In an audiovisual recording device, a buffer is an important element for buffering data. Compared to the conventional technology that presets different buffers for various applications, the buffer of the technology provided in the present disclosure can be flexibly defined as a pre-buffer or a main buffer according to a current state of use. The present disclosure relates to a memory management method for continuously recording digital content and a circuit system operating the method.

In one aspect, the circuit system mainly includes a control unit, a memory, and a storage device. A buffer is set in the memory. The buffer can be defined as a pre-buffer or a main buffer according to a current state of use.

In the memory management method, under a continuous recording mode, a buffer of the circuit system is defined as a pre-buffer, and the circuit system sequentially buffers a continuously-received data to the pre-buffer in a first-in-first-out manner. When a start-record instruction is received, the circuit system enters an event-recording mode, the buffer is defined as a main buffer, a pre-buffer data buffered in the pre-buffer for a pre-buffer time can be combined with the data that is continuously buffered in the main buffer, and the combined data is written to a storage device until a stop-record instruction is received.

In another aspect, a size of the buffer of the circuit system is determined according to a target bit rate for generating the data and an access time of the pre-buffer. Furthermore, the buffer set in the memory can be a ring buffer. The data buffered in the buffer can be a video, an audio, or a combination thereof. The pre-buffer time of the pre-buffer can be dynamically adjusted or set to be turned-off.

Further, a pre-buffer time is set for the pre-buffer. When the start-record instruction is received, the data buffered in the pre-buffer for the pre-buffer time and the data that is continuously buffered in the main buffer are written into the storage device until the stop-record instruction is received.

Further, the memory management method can be operated in a recording device having a control interface for a user to generate the start-record instruction and the stop-record instruction by a contact or a contactless manner.

Still further, the control interface can be used to switch among multiple recording modes including the continuous recording mode, the event-recording mode, and a privacy mode. When the circuit system is switched to the privacy mode, the circuit system does not write any file to the storage device.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
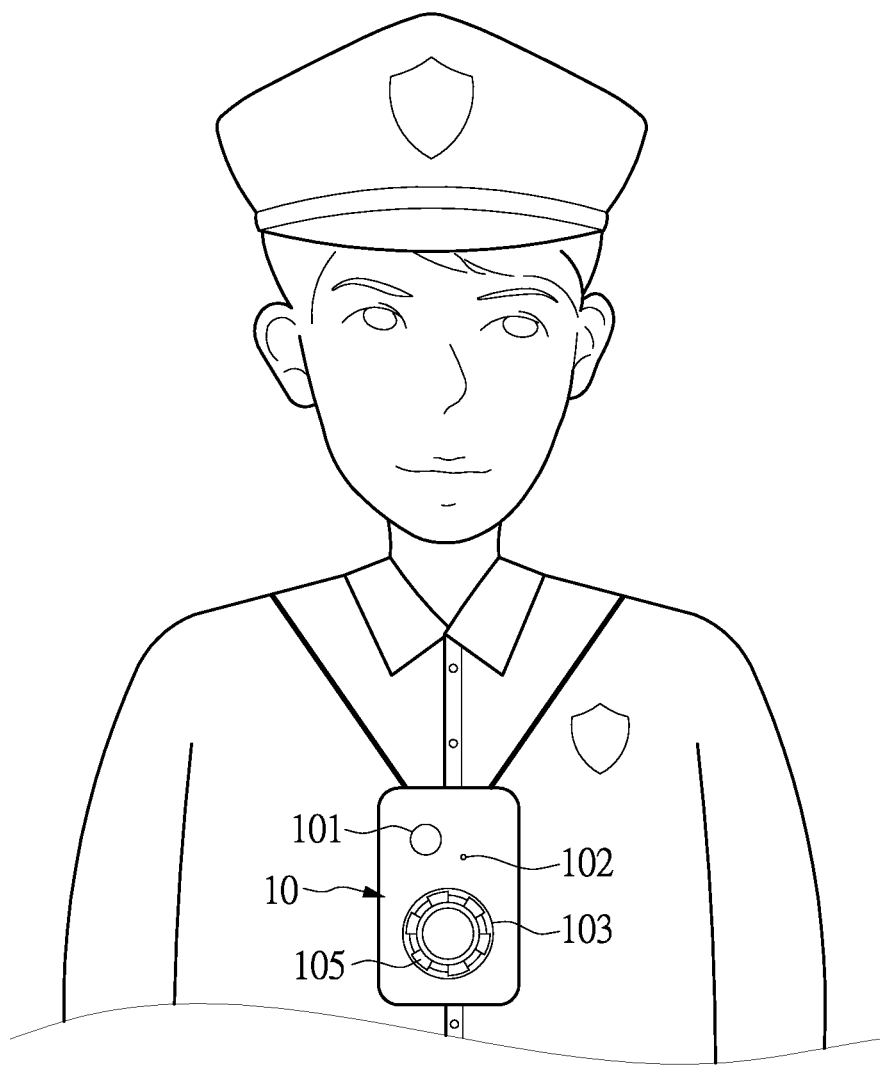
FIG. 1 is a schematic diagram illustrating a circumstance of using a circuit system to perform a memory management method for continuously recording digital content according to one embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

A buffer is an important data access element in an audiovisual recording device. Compared with the conventional technology that provides various buffers for different applications, in the present disclosure, one of the objectives of a memory management method for continuously recording digital content and a circuit system that performs the method is to allow for flexibly defining a buffer as a main buffer or a pre-buffer according to a current state of use.

In the circuit system of the present disclosure, one objective of the system is to define a same buffer to be a buffer having various functions under various circumstances. Therefore, the space of the buffer can be effectively used and the integrity of the data to be processed can be ensured. The data that is continuously recorded can be a video, an audio, or a combination thereof. A corresponding recording process can be video recording, audio recording, or video and audio recording at the same time.

The circuit system can be a circuit module operated in a recording device. The control circuits of the circuit module perform the memory management method for continuously recording digital content through a collaborative work of software and hardware. The recording device is such as an audiovisual device that requires integrity of audiovisual content. In one embodiment, reference is made to FIG. 1, which is a schematic diagram illustrating a circuit system operating the memory management method for continuously recording digital content. It should be noted that the exemplary examples are not intended to limit the scope of the memory management method for continuously recording digital content of the present disclosure.

In the diagram, a person wearing a recording device 10 is shown. The recording device 10 can be a portable video recorder worn by a law enforcement officer or a person performing a specialized task. The portable video recorder is generally used to collect complete audiovisual data at critical moments without loss of critical images. Therefore, the audiovisual data can act as a piece of effective evidence since the integrity of the audiovisual data is ensured. The recording device 10 requires power to operate, and is typically required to collect data over a long period of time. It should be noted that the method of the present disclosure can be operated in various audiovisual devices that are capable of continuously recording digital content. The circuit system performing the method can ensure that critical images are not lost when various audiovisual devices are used to continuously record the audiovisual content over a long period of time.

One main function of the recording device 10 is to record a video through a photographic lens 101 and a microphone 102 mounted on a housing of the recording device 10. The recording device 10 is able to take a video, an audio, or both the video and audio at the same time. The recording device 10 can operate for a long time through circuits and software. A control interface 103 disposed on the housing is provided for a user to operate. The control interface 103 can be implemented as a dial, a lever for switching functions, a button, or a touch interface in a mechanism or software manner. The control interface 103 of the present example includes a mode-switching interface 105 that allows a user to switch to one of the recording modes according to a practical application. The recording modes generally include a continuous recording mode and an event-recording mode. The buffer can be switched to any buffer mode under the different recording modes. The buffer modes mainly include a main buffer mode and a pre-buffer mode.

In one embodiment of the present disclosure, the recording device 10 can operate under the continuous recording mode, the event-recording mode, or a privacy mode that is set by using a remote server or the control interface 103 of the recording device 10. The user can enable one of the functions of the control interface 103 to write the buffered data to a storage device of the recording device 10 in form of a file. For example, under the continuous recording mode that the buffer of the memory is defined as the pre-buffer, the recording device 10 continuously operates and the data in the pre-buffer is directly stored to the storage device. Furthermore, under the continuous recording mode, the data in the pre-buffer can be optionally retained in the storage device or uploaded to the remote server. Moreover, if a switching instruction for switching to any other recording mode or buffer mode is received when the recording device operates under the continuous recording mode, the continuous recording mode is terminated and the privacy mode or the event-recording mode is entered. If the recording device operates under the event-recording mode, the buffer is defined as the main buffer and the data buffered in the main buffer is stored to the storage device. If the recording device operates under the privacy mode, the circuit system does not write the data to the buffer or write any file to the storage device.

Figure 2:
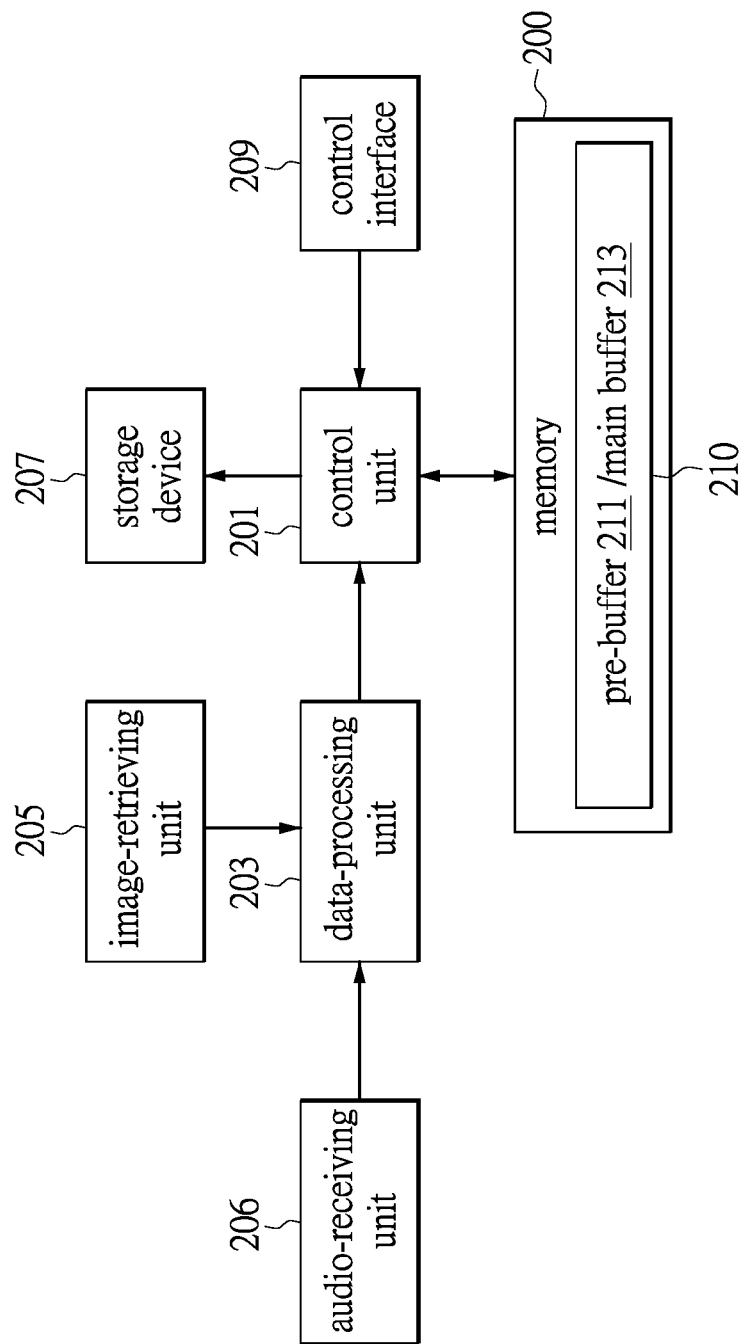
FIG. 2 is a schematic diagram of the circuit system that performs the memory management method for continuously recording digital content according to one embodiment of the present disclosure.

The memory management method for continuously recording digital content can be implemented in the recording device 10 through a collaborative work of firmware of the circuit system or software and hardware. Reference is made to FIG. 2, which is a schematic diagram of a frame-work of the circuit system according to one of the embodiments of the present disclosure.

In the embodiment shown in the diagram, main components of the circuit system include a control unit 201, a requisite memory 200, and a storage device 207 that are electrically interconnected. The memory 200 can be a random access memory (RAM) or a specific memory of the circuit system. The memory 200 can be configured to have a buffer 210 that can be defined as a main buffer 213 or a pre-buffer 211 according to a current situation, e.g., the recording mode. The storage device 207 can be implemented by using a non-volatile memory such as a flash memory or a hard disk.

The control unit 201 can be implemented by various logic circuits that are electrically connected with circuit components of the circuit system. The circuit components of the circuit system include a read circuit and a write circuit. The control unit 201 performs the memory management method for continuously recording digital content by means of software or with operations of hardware. According to an exemplary example shown in the diagram, the circuit system also includes other circuit components such as a data-processing unit 203 used to process audiovisual data, an image-retrieving unit 205 used to receive images, and an audio-receiving unit 206 used to receive audio data that are electrically connected with the control unit 201.

According to one of the embodiments of the present disclosure, the circuit system loads the continuously-received data via the image-retrieving unit 205 and the audio-receiving unit 206. The data can be a video, an audio, or a combination thereof. When the circuit system is in operation, the buffer 210 can dynamically operate as the pre-buffer 211 or the main buffer 213. The data instantly received by the circuit system can be sequentially buffered to the pre-buffer 211 or the main buffer 213 in a first-in-first-out (FIFO) manner. The control unit 201 controls the pre-buffer 211 to buffer the data that is instantly received. Before the start-record instruction is received, the data that is instantly received can continuously and sequentially update the data buffered in the pre-buffer 211. When the control unit 201 receives the start-record instruction, the buffer 210 is defined as the main buffer 213, and the data previously buffered during the pre-buffer time is retrieved. Afterwards, the main buffer 213 starts to buffer the following data and the data is then written to the storage device 207.

It should be noted that, compared to the conventional technology that pre-configures different buffers for different applications, the buffer 21 of the circuit system of the present disclosure can be adaptively operated as the pre-buffer 211 or the main buffer 213. Therefore, the buffer of the memory of the circuit system can be efficiently used since only the one buffer is shared by the different recording modes of the circuit system.

The circuit system is disposed in the recording device. According to one embodiment, the recording device provides a control interface 209, and the control interface 209 is electrically connected with the control unit 201 of the circuit system. The control interface 209 allows the user to control operations of the recording device by a contact or contactless manner. For example, the user can decide to use one of the recording modes by the control interface 209. The recording mode can be the privacy mode, the continuous recording mode, or the event-recording mode. When one of the recording modes is determined, a start-record instruction or a stop-record instruction is generated. For example, the control interface 209 can be an interface mounted on a housing of the recording device, and the control interface 209 can be a contact control interface that can be a physical button or a touch interface. The control interface 209 can also be a contactless control interface that can generally refer to a wirelessly-manipulated remote control (e.g., an infrared remote control, a Wi-Fi™ remote control, or a BLUETOOTH™ remote control), a wired-manipulated remote control that is operated via an Ethernet communication protocol, or manipulation manners such as remote manipulation by a remote server, a voice input, or a gesture operation.

Thus, the user or any remote control can generate a control instruction via the control interface 209. For example, in the memory management method for continuously recording digital content operated in the control unit 201, before the circuit system receives the start-record instruction, the control unit 201 drives the memory 200 to define the buffer 210 as the pre-buffer 211, use the pre-buffer 211 to buffer the data to be received, and sequentially update the data in the pre-buffer 211. One of the main objectives of the method is to save the current buffered data through the pre-buffer 211 before the start-record instruction is received. After the start-record instruction is received, the buffer 210 is defined as the main buffer 213 and the data buffered in the pre-buffer 211 for the pre-buffer time is immediately retrieved. In the meantime, the pre-buffer data buffered for the pre-buffer time is combined with the following data continuously buffered in the main buffer 213 and then the combined data is written to the storage device 207. This process continues until the stop-record instruction generated by the control interface 209 is received.

Further, in one embodiment of the present disclosure, the size of the buffer 210 can be determined according to practical requirements. For example, the control unit 201 determines the size of the buffer 210 requested by the circuit system according to a target bit rate of the data generated by the recording device and an access time of the pre-buffer. For example, the size of the buffer 210 is equal to the target bit rate multiplied by the access time of the pre-buffer.

When the control unit 201 receives the start-record instruction, the data buffered in the pre-buffer 211 for the pre-buffer time is combined with the data that is continuously buffered in the main buffer 213. The data is synchronously written to the storage device 207 until the stop-record instruction is received. Further, when the buffer 210 is defined as the pre-buffer 211, a pre-buffer time can be defined or set to be off. That is, the control unit 201 of the circuit system can configure the pre-buffer 211 to have the pre-buffer time that can be 10 seconds, 20 seconds, 30 seconds, 60 seconds, or 120 seconds that is set based on practical requirements. It should be noted that the present disclosure is not limited by the exemplary example.

Figure 3:
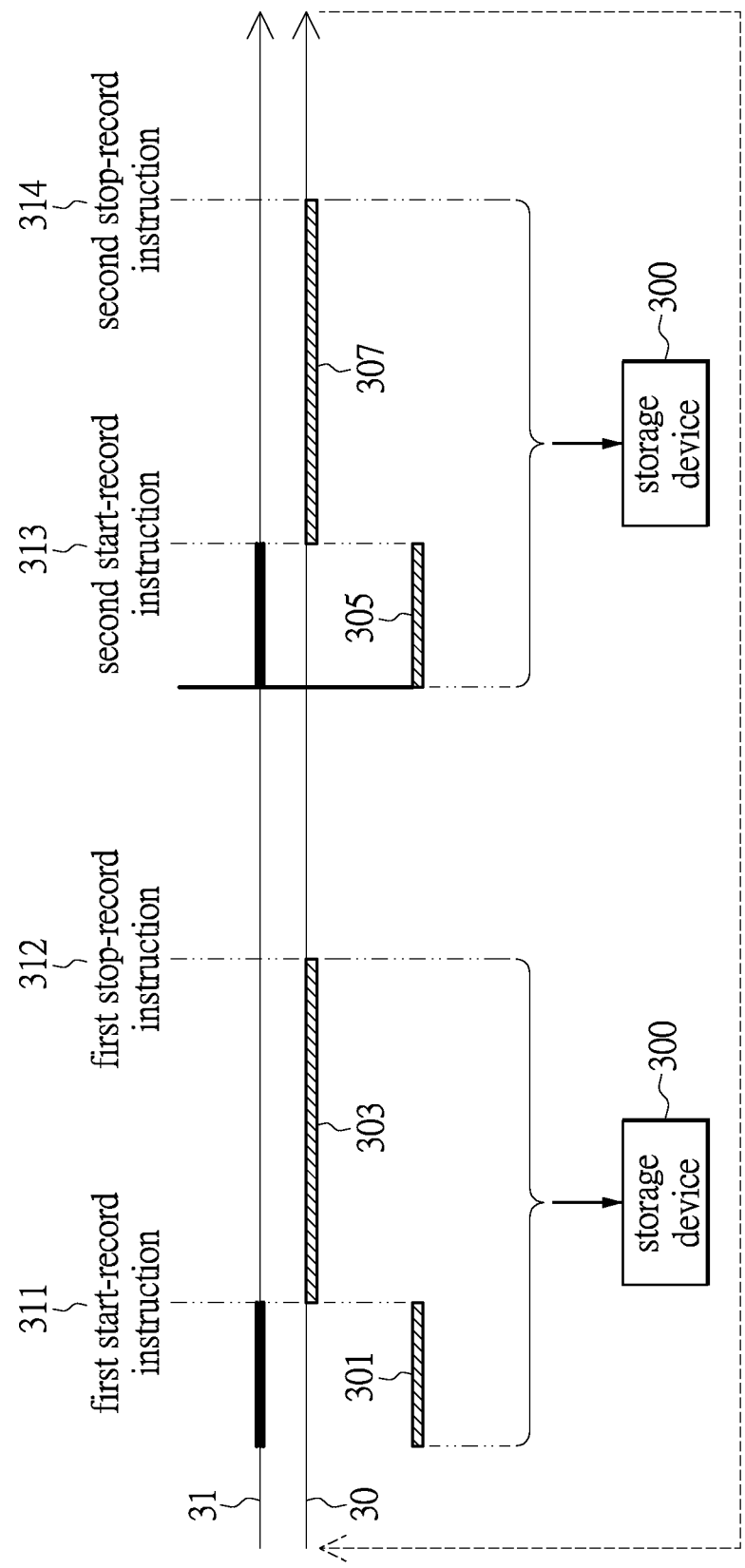
FIG. 3 is a schematic diagram illustrating an operation of a memory in the memory management method for continuously recording digital content according to one embodiment of the present disclosure.

FIG. 3 is a schematic diagram illustrating operation of the memory in the memory management method for continuously recording digital content according to one embodiment of the present disclosure.

When the circuit system receives the data content that is continuously generated, the data is buffered to a buffer in chronological order in a first-in-first-out manner. In one of the embodiments of the present disclosure, the buffer used in the memory management method can be a ring buffer. One of the technical concepts is that, in view of a limited buffer space, when the buffer space is exhausted, the following received digital content overwrites the previous buffered digital content in chronological order based on the design of the ring buffer.

Two timelines are shown in FIG. 3. One of the timelines is a continuous recording timeline 31 that is used to illustrate a recording device continuously receiving data under the continuous recording mode, in which the data is firstly buffered in the pre-buffer defined from the memory of the recording device, and then stored to a storage device 300. The other timeline is an event-recording timeline 30 that is used to illustrate the recording device operating under the event-recording mode when the start-record instruction generated by the control interface is received, in which the buffer is defined as the main buffer. Under the event-recording mode, the pre-buffer data is combined with the data that is continuously buffered in the main buffer, and the combined data is written to the storage device and can also be uploaded to a server.

Further, in the diagram, according to the continuous recording timeline 31, the circuit system is configured to buffer the received data to the main buffer in chronological order. According to the event-recording timeline 30, when a first start-record instruction 311 is received, the circuit system retrieves the data that forms a first pre-buffer data 301 being buffered in the pre-buffer for the pre-buffer time. At this time, the buffer is defined as the main buffer and the circuit system continuously retrieves the data that forms a first main buffer data 303 being buffered in the main buffer.

In the present example, within a first period of time, when the first start-record instruction 311 is received, the circuit system combines the first pre-buffer data 301 that is buffered for a previous period of time and the first main buffer data 303 buffered in the main buffer and stores the combined data into the storage device 300. This process continues until the circuit system receives a first stop-record instruction 312.

After the first stop-record instruction 312 is received, the circuit system enters the continuous recording mode according to the continuous recording timeline 31, so that the pre-buffer is used to continuously and sequentially buffer the data that is received by the circuit system.

According to the event-recording timeline 30, within a second period of time, when the circuit system receives a second start-record instruction 313, the data buffered in the pre-buffer forms a second pre-buffer data 305, and the buffer is defined as the main buffer. The circuit system starts to continuously receive data that forms a second main buffer data 307. Similarly, the second pre-buffer data 305 that is buffered for a previous period of time is combined with the second main buffer data 307 that is buffered in the main buffer, and the combined data is stored to the storage device 300. When the circuit system receives a second stop-record instruction 314, the circuit system stops writing the buffered data into the storage device 300.

In one embodiment of the present disclosure, the function of the pre-buffer can be turned off. Under the condition of the pre-buffer being turned off by the circuit system and when the circuit system receives the start-record instruction, only the data continuously buffered in the main buffer is written into the storage device 300 until the stop-record instruction is received.

According to one embodiment of the present disclosure, the memory management method is operated in the circuit system of a recording device, and the recording device can perform continuous long-term recording and real-time streaming data transmission with a remote control center when needed.

The recording device provides multiple recording and buffer modes through the circuit system. The recording mode of the circuit system of the recording device can be set by a remote server, and then the circuit system is configured to switch to one of the buffer modes according to an instruction. Therefore, if any special event occurs, the user or a software program performed in the recording device can automatically decide a timing to start recording and issue the start-record instruction. The circuit system then combines the data buffered in the pre-buffer for a period of time with the data continuously buffered in the main buffer and writes the combined data to the storage device. Therefore, the circuit system performing the memory management method can ensure that the content being recorded before the occurrence of the special event can be preserved for a period of time before the occurrence of the special event without critical data being lost. Next, when the special event ends, the user can manipulate the recording device to generate the stop-record instruction and stop writing the buffered data into the storage device. At this time, when the data relating to the special event can be stored to the storage device or uploaded to a specific server or device, a file for the special event can be created, and the file is configured to not be overwritten.

Figure 4:
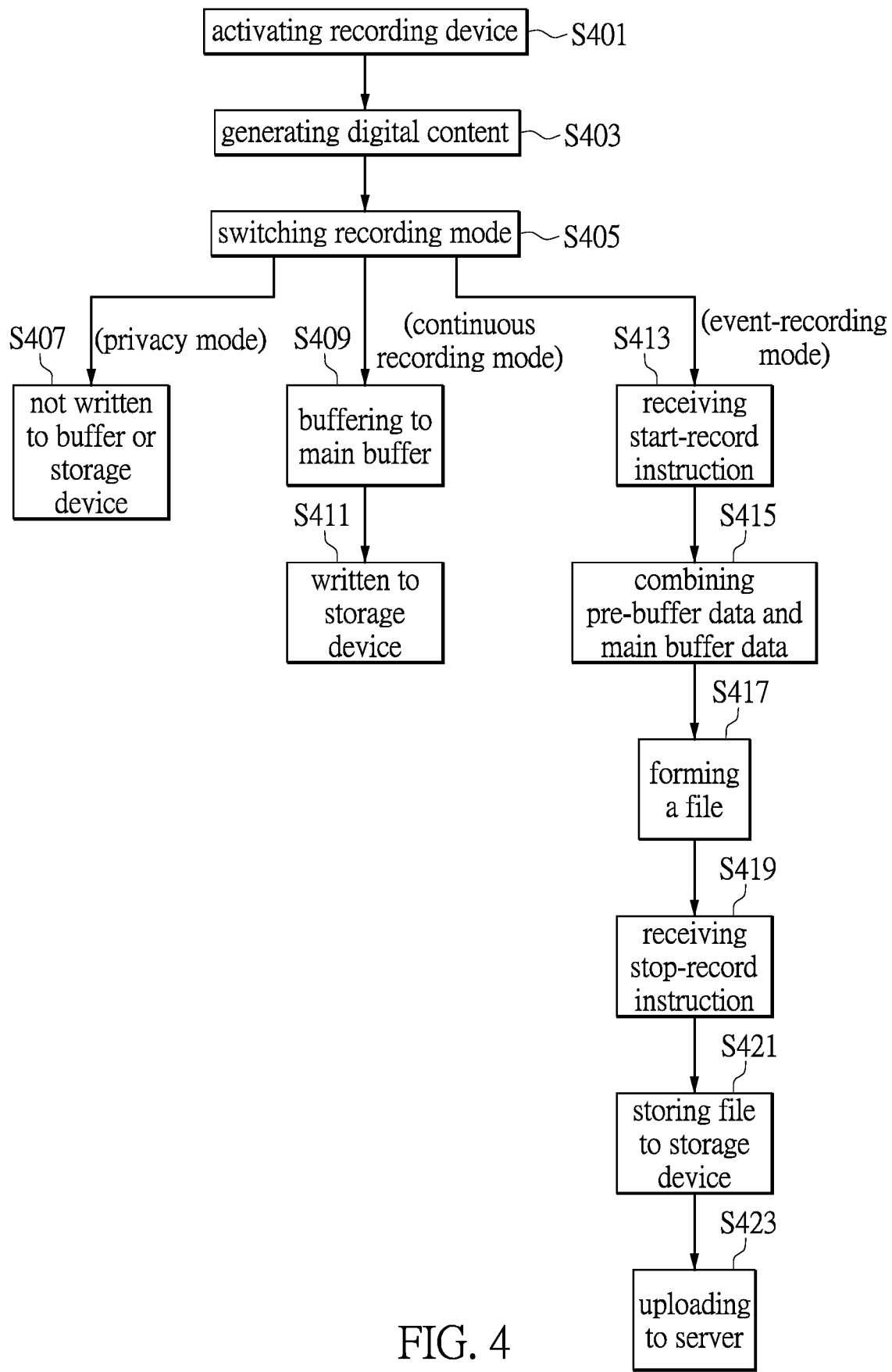
FIG. 4 is a flowchart illustrating the memory management method for continuously recording digital content according to one embodiment of the present disclosure.

Reference is made to FIG. 4, which is a flowchart illustrating the memory management method for continuously recording digital content according to one embodiment of the present disclosure.

In the beginning, the recording device is activated to start recording (step S401). When the recording device starts to capture images and record audio, a digital content including video, audio, or a combination thereof is continuously generated (step S403). When the recording device is in operation, the user can manipulate the control interface of the recording device to switch to one of the buffer modes (step S405). Furthermore, the recording device can still automatically activate a function of recording and switch to one of the recording modes under a specific condition, e.g., the recording device senses a collision event or a drop event.

The embodiments of the present disclosure provide several recording modes as follows.

When the circuit system is configured to be under a privacy mode, such as in step S407, the recording device stops recording video and audio for neither writing the content to a buffer nor storing the content to a storage device. It should be noted that, under the privacy mode, the circuit system can still receive the start-record instruction, and the data will be directly written to a main buffer and then stored to the storage device since no buffer is defined as a pre-buffer.

When the circuit system is configured (or set by a remote server) to be under a continuous recording mode, without receiving any instruction to start recording, the buffer is defined as the pre-buffer and the received digital content is directly buffered to the pre-buffer (step S409). The digital content buffered in the pre-buffer is then written to the storage device (step S411). Therefore, the circuit system achieves a purpose of long-term recording until the recording device is turned off or switched to another recording mode.

When the circuit system receives the start-record instruction, the circuit system is set in the event-recording mode. For example, in step S413, the circuit system defines the buffer in the memory to be the main buffer. In the memory management method for continuously recording digital content, referring to the above embodiments and the exemplary flowchart illustrated in FIG. 5, the pre-buffer data previously retrieved from the pre-buffer is combined with the main buffer data that is buffered in the main buffer when receiving the start-record instruction (step S415). A new file that records a specific event is formed (step S417). After the stop-record instruction is received (step S419), the file formed by the buffered data can be written to the storage device (step S421) and uploaded to a server (step S423).

Figure 5:
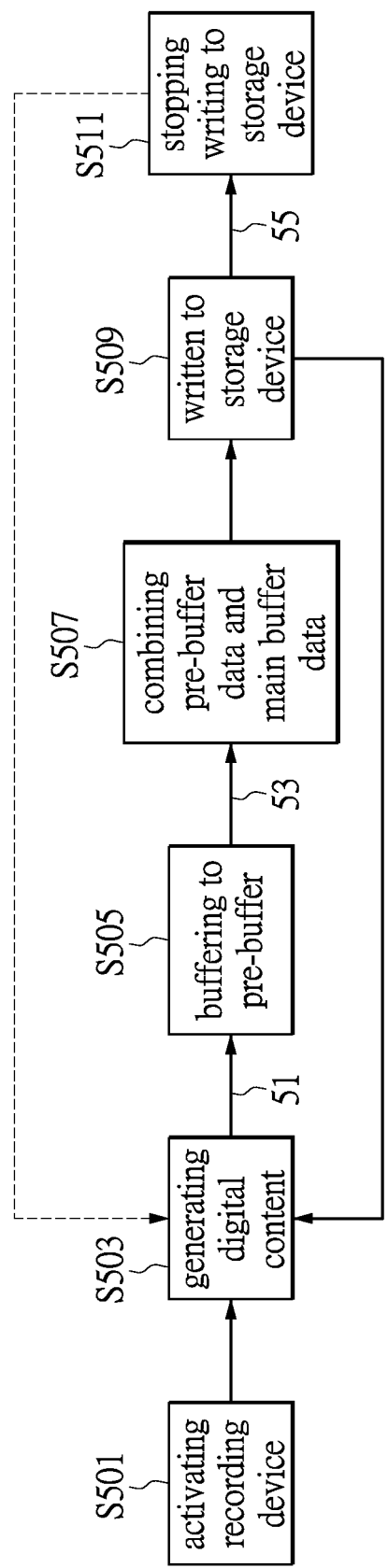
FIG. 5 is another flowchart illustrating the memory management method for continuously recording digital content according to one embodiment of the present disclosure.

Reference is further made to FIG. 5, which is a flowchart illustrating a process of operating the event-recording mode of the buffer mode of FIG. 4 according to one embodiment of the present disclosure.

According to the present embodiment, when the recording device is activated (step S501), the recording device continuously generates data that can be a specific type of digital content (step S503). Under the event-recording mode 51, the circuit system retrieves the data buffered in the pre-buffer for a per-buffer time according to a start-record instruction 53 (step S505), and combines the pre-buffer data with the main buffer data that is sequentially buffered in the main buffer in a first-in-first-out manner (step S507). The combined data is then written to the storage device (step S509). The combined data including the data buffered in the pre-buffer for a period of time and the data that is continuously buffered in the main buffer is stored to the storage device. Before the circuit system receives a stop-record instruction 55, the data buffered in the buffer will be repeatedly written to the storage device until the stop-record instruction 55 is received for stopping writing the data to the storage device (step S511).

In the abovementioned flowchart, when the circuit system receives the start-record instruction 53, the data buffered in the pre-buffer and the following data buffered in the main buffer are separately written into different files or are integrally written into one same file.

In conclusion, according to the above embodiments relating to the memory management method for continuously recording digital content and the circuit system, the mechanism of the pre-buffer in the memory management method allows the circuit system to ensure data integrity. Further, for the audiovisual content, the pre-buffer mechanism allows the circuit system to effectively retain the critical audiovisual content.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A memory management method for continuously recording digital content, operated in a circuit system, comprising:
    defining, under a continuous recording mode, a buffer of the circuit system as a pre-buffer, and the circuit system sequentially buffering a continuously-received data to the pre-buffer in a first-in-first-out manner, wherein a size of the buffer is determined according to a target bit rate for generating the continuously-received data and an access time of the pre-buffer; and
    when a start-record instruction is received, entering, by the circuit system, an event-recording mode and defining, by the circuit system, the buffer as a main buffer, so that a pre-buffer data buffered in the pre-buffer for the access time of the pre-buffer and the continuously-received data that is continuously buffered in the main buffer are combined to yield combined data, and the combined data is written to a storage device until a stop-record instruction is received.

2. The memory management method according to claim 1, wherein the memory management method is operated in a recording device having a control interface for a user to generate the start-record instruction or the stop-record instruction by a contact or contactless manner.

3. The memory management method according to claim 1, wherein a memory of the circuit system is pre-configured as the buffer that is used to store the continuously-received data, and the circuit system defines the buffer as the pre-buffer or the main buffer according to the start-record instruction or the stop-record instruction received by the circuit system.

4. The memory management method according to claim 3, wherein the memory management method is operated in a recording device having a control interface for a user to generate the start-record instruction or the stop-record instruction by a contact or contactless manner.

5. The memory management method according to claim 1, wherein the buffer set in memory is a ring buffer, the continuously-received data buffered in the buffer is a video, an audio, or a combination thereof, and the access time of the pre-buffer is dynamically adjusted or set to be turned-off.

6. The memory management method according to claim 5, wherein the memory management method is operated in a recording device having a control interface for a user to generate the start-record instruction or the stop-record instruction by a contact or contactless manner.

7. The memory management method according to claim 6, wherein the control interface is used for switching among multiple recording modes that comprise the continuous recording mode, the event-recording mode, and a privacy mode.

8. The memory management method according to claim 7, wherein, when the circuit system is switched to the privacy mode, no file is written to the storage device.

9. A circuit system, comprising:
    a control circuit;
    a memory electrically connected with the control circuit and setting a buffer that is defined as a main buffer or a pre-buffer according to a current situation;
    a storage device electrically connected with the control circuit;
    wherein the control circuit operates a memory management method for continuously recording digital content, comprising:
        defining, under a continuous recording mode, the buffer of the circuit system as the pre-buffer, and the circuit system sequentially buffering a continuously-received data to the pre-buffer in a first-in-first-out manner, wherein a size of the buffer is determined according to a target bit rate for generating the continuously-received data and an access time of the pre-buffer; and
        when a start-record instruction is received, entering, by the circuit system, an event-recording mode and defining, by the circuit system, the buffer as the main buffer, so that a pre-buffer data buffered in the pre-buffer for the access time of the pre-buffer and the continuously-received data that is continuously buffered in the main buffer are combined to yield combined data, and the combined data is written to the storage device until a stop-record instruction is received.

10. The circuit system according to claim 9, wherein the circuit system is disposed in a recording device having a control interface, and the control interface is electrically connected with the control circuit of the circuit system so that the control interface is used to determine a recording mode; wherein the control interface allows a user to generate the start-record instruction and the stop-record instruction by a contact or contactless manner.

11. The circuit system according to claim 10, wherein the control interface is used for switching among multiple recording modes that comprise the continuous recording mode, the event-recording mode, and a privacy mode.

12. The circuit system according to claim 11, wherein, when the circuit system is switched to the privacy mode, the circuit system does not write any file to the storage device.

13. The circuit system according to claim 10, wherein the recording device comprises a data-processing unit, and an image-retrieving unit and an audio-receiving unit that are electrically connected with the data-processing unit; and the continuously-received data generated by the recording device is a video, an audio, or a combination thereof.

14. The circuit system according to claim 9, wherein the buffer set in the memory is a ring buffer, and the the access time of the pre-buffer is dynamically adjusted or set to be turned-off.

15. The circuit system according to claim 14, wherein the circuit system is disposed in a recording device having a control interface, and the control interface is electrically connected with the control circuit of the circuit system, so that the control interface is used to decide a recording mode; wherein the control interface allows a user to generate the start-record instruction and the stop-record instruction by a contact or contactless manner.

16. The circuit system according to claim 15, wherein the control interface is used to switch among multiple recording modes that comprise the continuous recording mode, the event-recording mode, and a privacy mode.

17. The circuit system according to claim 16, wherein, when the circuit system is switched to the privacy mode, the circuit system does not write any file to the storage device.

18. The circuit system according to claim 15, wherein the recording device comprises a data-processing unit, and an image-retrieving unit and an audio-receiving unit that are electrically connected with the data-processing unit; and the data generated by the recording device is a video, an audio, or a combination thereof.

* * * * *